United States Patent [19]
Bachmann

[11] 3,885,386
[45] May 27, 1975

[54] ANNULAR PISTON ENGINE WITH AFTERBURNER AND SEPARABLE POWER TURBINE

[76] Inventor: William V. Bachmann, 22517 Ten Mile Rd., St. Clair Shores, Mich. 48080

[22] Filed: Apr. 22, 1974

[21] Appl. No.: 462,790

Related U.S. Application Data

[63] Continuation-in-part of Ser. No. 363,247, May 23, 1973, Pat. No. 3,807,168, which is a continuation of Ser. No. 116,892, Feb. 19, 1971, abandoned.

[52] U.S. Cl. .................. 60/307; 60/624; 60/605; 123/52 B
[51] Int. Cl. ............................................ F02b 37/02
[58] Field of Search ............ 60/307, 317, 605, 280, 60/606; 123/52 B, 51 BA

[56] References Cited
UNITED STATES PATENTS

| | | | |
|---|---|---|---|
| 1,105,500 | 7/1914 | Engles | 60/624 |
| 1,176,207 | 3/1916 | Dempsey | 60/619 |
| 1,300,026 | 4/1919 | Rousseau | 60/624 |
| 1,576,837 | 3/1926 | Marr | 123/52 B |
| 2,583,651 | 1/1952 | Horning | 60/280 |
| 2,734,494 | 2/1956 | Waterval | 123/52 B |
| R23,444 | 12/1951 | Nettel | 60/605 |

FOREIGN PATENTS OR APPLICATIONS

| 901,605 | 3/1953 | Germany | 123/52 B |
|---|---|---|---|

Primary Examiner—C. J. Husar
Assistant Examiner—Warren Olsen
Attorney, Agent, or Firm—Lon H. Romanski

[57] ABSTRACT

An internal combustion engine includes an annular or ring-type cylinder and piston therein; exhaust ports from the cylinder lead to an afterburner reactor situated generally medially of the annular cylinder; the exhaust gases are further burned within the afterburner section; to further reduce pollutants during the afterburning process, additional air is pumped into the afterburner section as by the ring piston due to its special configuration enabling it to accomplish, for example, triple functions such as: (a) to act as a power transmitting means, (b) to act as a pumping means to supply the engine's combustion chamber with scavenging air and/or an air-fuel mixture, and (c) to act as an air pumping means to supply desired quantities of ambient air into the afterburner section even in timed intervals with a constant predetermined pressure and predetermined quantities in order to thereby maximize the degree of control of the temperature generated in the afterburner and thereby more nearly fully oxidize the unburned fuel residues entering the afterburner. The ring piston is so constructed that it can be operatively connected to an output shaft as through the use of only a single crank, single connecting rod and wrist pin. Further, to extract a considerable amount of energy from the waste exhaust gases leaving the afterburner, a power turbine is provided which is within the exit path of the exhaust gases. The power turbine is conveniently incorporated as into the engine head and the turbine output shaft is either geared by reduction gear means to work in unison with the output crank shaft, or the turbine shaft rotates at an independent speed and is geared to drive (some or all of) the engine and/or vehicular accessories.

24 Claims, 13 Drawing Figures

ANNULAR PISTON ENGINE WITH AFTERBURNER AND SEPARABLE POWER TURBINE

RELATED APPLICATIONS

This application is a continuation-in-part of my co-pending application Ser. No. 363,247 filed May 23, 1973, U.S. Pat. No. 3,807,168 entitled: Annular Piston Engine With Afterburner And Power Turbine, which, in turn, is a continutation of my earlier filed application Ser. No. 116,892 filed Feb. 19, 1971, now abandoned.

BACKGROUND OF THE INVENTION

The recent public awareness of and concern regarding air pollution has resulted in a considerable attack on automotive engines of the prior art and the part that they play in contributing to the problem of air pollution. However, dealing with the acute air pollution problems, stemming from the great number of automobiles in operation is, to say the least, very complicated in theory as well as in practice. In fact the latest experiences in the art of pollution-controlling technology, in connection with Otto cycle reciprocating piston internal combustion engines, has conclusively shown that the costly add-on pollution control devices greatly increase the fuel consumption of such an engine when compared to the same engine previously operating without such devices. If the prior art proposed solutions are analyzed, it will be found that each proposed solution or system has more flaws than efficiency. Even combining the most desirable features of every system heretofore proposed would not achieve much more than raise the overall cost of the engine.

The basic obstacle to an efficient remedy for the air pollution produced by the automotive engines must be attributed to the peculiarities of the design principles on which such prior art engines have been engineered to obtain the present day high performance.

In the past, high performance but inexpensive engines was the general goal. However, in achieving such a goal, the inherent pollution potential of such engines was totally disregarded. Now, because of the concern with air pollution, the problem of eliminating the pollution created by such prior art engines has been added to the overall design considerations for such engines. However, it has been found that such prior art engines do not readily adapt themselves to the additional tasks (the limitation or elimination of exhaust pollutants) which they are now expected to perform. Therefore, only minor improvements have been and will be made in the future with, what is considered, unreasonable cost penalties.

A successful solution to the problem of exhaust emissions and air pollution can hardly be expected with the use of technology as is known in the prior art. For example, the following are but a few of the characteristics of the prior art internal combustion reciprocating engines which present a hindrance to arriving at a successful solution of air polluting exhaust emissions.

Today's high performance internal combustion engines are generally of the 8-cylinder, four-stroke type and have:

1. a high compression ratio, some in the order of 10:1 or over;
2. dual or four barrel carburetors;
3. a 300 to 400 cubic inch breathing volume;
4. a crank speed, at rated horsepower, of from 4,000 to 5,000 R.P.M.;
5. intake and exhaust valves (some single — some dual) which can leak;
6. mechanism intended for synchronizing the opening and closing of the intake and exhaust valves resulting in such valves having inherently built in blow down losses which waste fuel and contribute to the pollution of the air;
7. exhaust manifolds which are always filled to capacity with piston exhaust residues which are incompletely burned gases and as such rush through the manifold at sonic speeds;
8. carburetor fuel-air mixtures leaking (or evaporating) to the ambient atmosphere;
9. unburned fuel-air mixtures leaking into the interior of the engine crankcase;
10. inherent crankcase pollution with resulting varnish deposits and sludge contamination of the crankcase oil;
11. erosion of vital engine parts and exhaust muffler system by attack of lead acids arising from the combustion of leaded fuels;
12. the need for at least limited amounts of tetraethyl lead to lubricate valve seats to prevent mechanical erosion thereof;
13. heat losses through cylinder walls, cylinder heads and pistons but mostly through early exhausting of the combustion gases to the atmosphere;
14. exhaust emissions comprised of quantities of hydrocarbons, monoxide, lead, nitrous oxide and sulphur acids far too great to be tolerable;
15. a fuel to power conversion efficiency of less than twenty seven (27%) percent; and
16. a mechanical efficiency of not more than eighty five (85%) percent.

Nearly every engine characeristic listed in the foregoing may be declared as being adverse to any corrective measure which is intended to reduce air polluting exhaust emissions of such prior engines. The efforts to solve the exhaust emission pollution problem within the limitations found and described above for any of the conventional internal combustion engines have resulted, as is generally well known, in very disappointing side effects. All prior art proposed technical solutions, even if they operated at all, have unsatisfactory side effects. For example, in addition to the fact that such prior art devices are generally of an exorbitant cost, more space is required in and about the vehicle engine compartment to accommodate such prior art devices, the vehicle has to carry the extra weight of such prior art devices, and on an average the fuel consumption of the engines increased by approximately twenty (20%) percent.

The resulting increase in rate of fuel consumption is, of course, of national concern and therefore, it is submitted that an acceptable solution to engine exhaust emissions requires that the engine reduce its emission output without any increase in the rate of fuel consumption. This, the prior art has not been able to achieve.

Accordingly, the invention as herein disclosed and described is concerned with the elimination of such of the above characteristics as are deemed to be incompatible to an engine which is highly efficient and yet capable of producing its power without the attendant exhaust pollutants of the prior art.

SUMMARY OF THE INVENTION

According to the invention an internal combustion engine comprises an engine housing with an annular cylinder formed therein which receives a ring piston for reciprocating movement therein, an afterburner section formed generally medially of the annular cylinder and effective to receive the exhaust gases from the annular cylinder for further burning with added ambient air with such air being supplied even in measured quantities, gas turbine means generally within the afterburner section for generating power from the continually expanding exhaust medium.

A general object of the invention is to provide an improved internal combustion engine which inherently provides a dramatically reduced level of exhaust emissions thereby reducing its contribution to air pollution.

Another object of the invention is to provide an improved internal combustion engine which inherently provides for simpler, less frequent and less costly maintenance and servicing.

Another object of the invention is to provide an improved internal combustion engine wherein crankcase blow-by emissions can be if not totally eliminated, at least substantially reduced.

A further object of the invention is to provide an improved internal combustion engine which can be efficiently operated with unleaded fuels.

A still further object of the invention is to provide an improved internal combustion engine which does not require the use of timed movable inlet and exhaust valves although the use thereof is not precluded.

Another object of the invention is to provide an improved internal combustion engine wherein the piston speed can be drastically reduced without effecting the power output thereof.

Another object of the invention is to provide an improved internal combustion engine which substantially reduces the heat loss through the cylinder walls and cylinder head and be further effective to convert such heat saved thereby to be part of the work-output of the engine.

A further object of the invention is to provide an improved internal combustion engine where ambient air is drawn in by the action of the engine's reciprocating piston to act as a coolant for the inner cylinder wall and as a mixing agent to the exhaust gases via the afterburner thereby promoting the oxidation of the unburned particles within the exhaust emissions.

A further object of the invention is to provide an improved internal combustion engine which extracts or generates a substantial quantity of energy from the specially pre-treated and boosted exhaust gas pressures via a gas turbine device which is part of the engine.

A further object of the invention is to provide alternatives to extract from the gas turbine means the reclaimed energy by either gearing the power turbine and the engine crankshaft in tandem, or to utilize the energy generated by the turbine for driving accessories independently of the crankshaft (thus saving on friction losses).

A further object of the invention is to improve substantially the fuel economy per se stemming mainly from above mentioned improvement factors, as energy re-claimed from exhaust waste, built in power boost within the exhaust gases via special after treatment by unique afterburner devices, reduced heat losses through cylinder walls via water jacket, reduced frictional horsepower losses by lowering the piston speed.

A still further object of the invention is to provide an engine assembly of a configuration whereby such gas turbine means may be readily disassembled therefrom and/or replaced without in any way requiring a major disassembly of the entire engine assembly.

Other general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENTS

Referring now in greater detail to the draiwngs, FIGS. 1–8 illustrate, in somewhat simplified form, an engine 10 constructed in accordance with the teachings of the invention. As illustrated, the engine 10 comprises an engine housing 12 with upper 14 and lower 16 engine housing sections suitably fixedly secured to each other as by any suitable means. The lower portion of lower housing section 16 is provided with suitable support bearings or journals 18 and 20 which rotatably support a power output shaft 22 including crank means 24 which has an eccentric or throw 26 rotatable therewith and suitably journalled to one end of a connecting rod 28 which, in turn, has its upper end suitably secured or journalled to a wrist pin 30. The space within lower housing section 16 generally accommodating the crank means 24 may be referred to as the crank chamber or cavity 32.

The upper portion of lower housing section 16 has a cylindrical wall 34, formed internally thereof, which receives a ring or annular piston, preferably of cup-like configuration, 36 for reciprocating movement therein. As is generally well known in the art, suitable piston rings 38 may be provided and carried by piston 36 as to affect a seal as between the cylindrical wall or chamber 34 and the juxtaposed outer surface 40 of piston 36.

A generally cylindrical member 42, which may be suitable fixedly secured to or integrally formed with upper housing section 14, has a downwardly depending portion with an outer cylindrical surface 44 formed thereon and adapted to be generally received in the piston 36. As illustrated, the piston 36 is also provided with an inner cylindrical wall or surface 46 generally juxtaposed to surface 44. A plurality of inner piston rings 48 may also be provided and carried by piston 36 as to affect a seal as between the outer cylindrical wall or surface 44 and the juxtaposed inner surface 46 of piston 36.

The variable but distinct volume or space 50, defined radially as between cylindrical surfaces 34 and 44 and axially as between the lower surface 52 of upper housing section 14 and the top or upper surface 54 of ring piston 36, may be referred to as the combustion chamber.

As shown, an additional chamber 54, of generally variable volume, is defined internally of the cup-shaped ring piston 36 by cooperation with the downwardly depending portion of member 42.

The lower housing section 16 is provided with a transverse dividing wall 60 which effectively seals the crank chamber 32 from the cylindrical wall 34 formed in the upper portion of the housing 16. The transverse dividing wall 60 has an aperture 62 formed therein for slidable reception of a cylindrical extension 56, which is a depending portion of the cup-shaped ring piston 36, having a diameter somewhat smaller than the overall diameter of the piston 36.

A plurality of piston rings 64 may be provided and carried by the cylindrical extension 56 as to affect a seal as between the cylindrical wall or surface of the aperture 62 and the juxtaposed outer surface 66 of the extension 56 of piston 36.

The cup-like ring piston 36 is operably connected with the cranking means through the wrist pin 30 which is pivotally journalled to the lower end of the cylindrical extension 56. Consequently, a relatively smaller total chamber 68 is formed between the bottom of piston 36 and the top 70 of the wall 60 than if wall 60 were eliminated and the chamber 68 actually formed a part of an overall larger chamber which also included crank chamber 32. Therefore, since the total volume of chamber 68 is significantly less than the total volume of such an assumed overall larger chamber, it follows that the ultimate compression and pressure rise of the gaseous and volatile contents within chamber 68 can be selectively higher and be adapted to specific conditions which, as later will become clear, are a contributing factor in obtaining better overall efficiency as attained by the engine of this invention.

Within housing section 16 are a plurality of passages or conduit means 72, 74, 76, 78 which have lower openings 80, 82, 84, 86 communicating with the chamber 68, while upper openings 90, 92, 94, 96 thereof communicate with the combustion chamber 50.

Housing portion 42 is also provided with a plurality of passages 100, 102, 104 and 106 which have their respective upper ends or openings 108, 110, 112 and 114 in communication with upper an chamber 116 formed within upper engine housing section 14, while their respective lower ends or openings are in communication with variable chamber 58. A valving member 120, comprising a stem 122 which may be guiding and slidably received within a guide member 124, is situated within housing portion or member 42. The lower portion of member 42 is provided with a generally annular valve seating surface 126 adapted to be at times in sealing engagement with valve member or head 120 as to thereby prevent communication therethrough and between passageway or reactor chamber 130 and chamber 58.

A first plurality of radially directed ports 132, 134, 136, 138 are formed through member 42 as to thereby maintain communication as between passageway or reactor chamber 130 and a second chamber 140 formed within upper housing section 14 while a second plurality or radially directed ports 142, 144, 146, 148 are also formed through member 42 in order to provide for communication as between combustion chamber 50 and chamber 130 and ultimately chamber 140.

Figure 1:
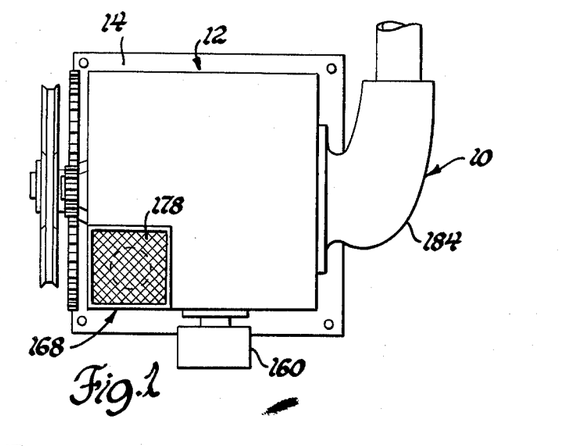
FIG. 1 is a top plan view of an engine constructed in accordance with the teachings of the invention.
Figures 2, 3:
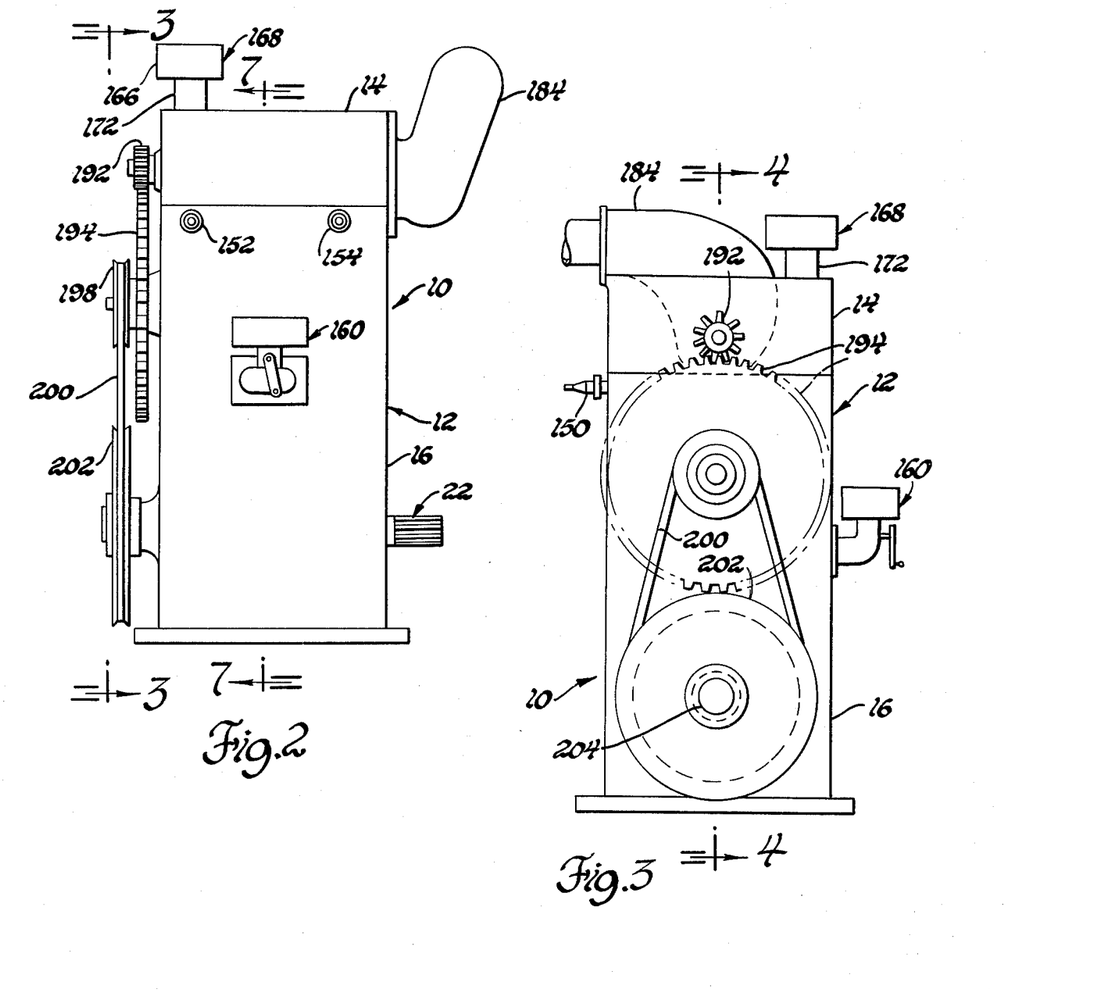
FIG. 2 is a side elevational view of the engine of FIG. 1 taken generally on the plane of line 2—2 of FIG. 1 and looking in the direction of the arrows.
FIG. 3 is an elevational view taken generally on the plane of line 3—3 of FIG. 2 and looking in the direction of the arrows.
Figure 5:
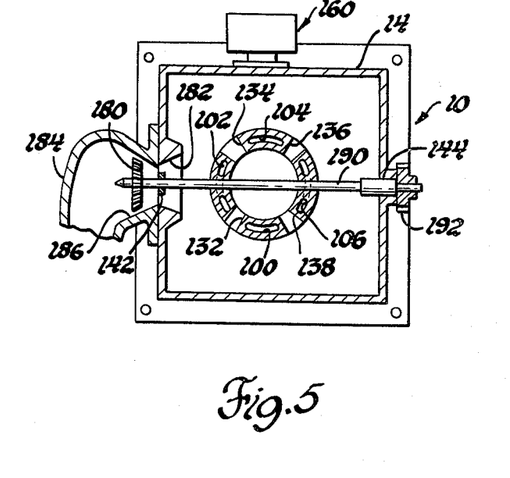
FIG. 5 is a transverse cross-sectional view taken generally on the plane of line 5—5 of FIG. 4 and looking in the direction of the arrows.
Figure 6:
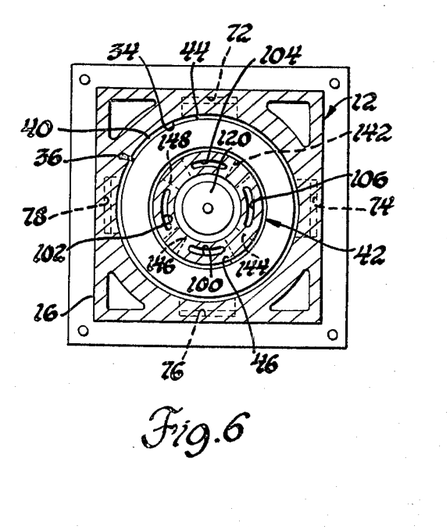
FIG. 6 is a transverse cross-sectional view taken generally on the plane of line 6—6 of FIG. 4 and looking in the direction of the arrows.

Preferably, as best shown or depicted by FIGS. 3 and 5 a plurality of angularly substantially equidistantly spaced plugs or nozzles 150, 152 and 154 are provided. The reason that elements 150, 152 and 154 are referred to as "plugs" or "nozzles" is that they may be ignition spark plugs or igniters in an engine where such are required to initiate combustion of the combustible mixture within the combustion chamber or they may be fuel injection nozzles if the engine is intended to operate, for example, on diesel fuel. If such elements are in fact spark plugs their operation is, of course, timed with respect to the movement of the piston 36 as by any suitable means (not shown) many of which are very well known in the art. Further, if such elements 150, 152 and 154 are in fact fuel injection nozzles, they would also be in combination with any suitable associated fuel supply and metering control means, not shown but many of which are also very well known in the art. The incorporation of a plurality of equidistantly distributed plugs or nozzles for each ring cylinder is to provide a more even force pattern of the exploding media and straight down pressure throughout the periphery of the ring piston 36.

Figure 4:
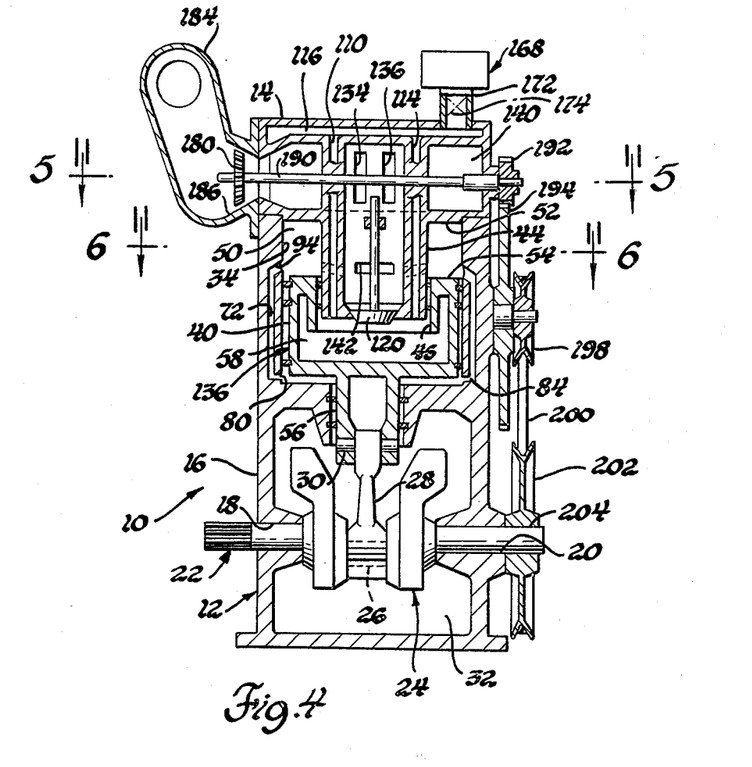
FIG. 4 is a cross-sectional view taken generally on the plane of line 4—4 of FIG. 3 and looking in the direction of the arrows.

As best shown in FIGS. 4 and 5, a power turbine wheel assembly 180 of suitable configuration and construction is provided and placed in the direct stream of the exhaust gases. (The usual up-stream stators as well known in the art would be provided for optimum efficiency.) It can be seen that the exhaust gases coming from the so-called afterburner chamber 130 will rush through the radially located ports 132, 134, 136 and 138 into the secondary chamber 140 which acts as a plenum chamber from where the exhaust gases are directed toward the power turbine wheel as via a venturi shaped exit opening 182. Suitable exhaust conduit means 184 is provided with preferably, a particular adapting means 186 to fit the operating contours of the turbine wheel 180, sealably enclose said turbine wheel 180 and be in registry with the outlet orifice 182 of chamber 140. A further purpose of conduit means 184 is, of course, to convey the engine exhaust gases, after they have struck the turbine wheel 180 while passing therethrough, to any desired point away from the engine.

A drive shaft 190 connected with the power turbine wheel is transversely located generally within the plenum chamber 140 and is journalled at least at both ends where suitable bearing means 142 and 144 are provided as by upper housing 14. The turbine drive shaft 190 has, at its opposite end from the turbine wheel, keying means and a small pinion gear 192 attached. Pinion 192 is in meshed engagement with a larger spur gear 194 for effective reduction of the fast rotating turbine shaft 190. The spur gear 194 is rotatably journalled and fastened to a suitable bearing shaft 196 anchored in housing 16. For further speed reduction and synchronization with the output crank shaft 22, a small V-belt pulley 198 may be used to drive, as through a V-belt 200, a larger pulley 202 which is keyed to the shaft end 204 of crank shaft 22.

The mixed reduction drive train set up, as exemplified, can be varied according to basic predetermined speed differentials between the optimal output speed of the turbine wheel 180 and the directly related crank 22 output r.p.m. If convenient all reduction gearing may be done by positive tooth gearing, however, as shown with a partially V-belt driven reduction drive train, certain backlash conditions, which may occur with speed changes, can be dampened through the inherent slip characteristics in V-belts.

In one embodiment of the invention the fuel is supplied as by a suitable throttle-controlled carburetor assembly 160 communicating via conduit means 162 with the chamber 68. Suitable check valve means 164 may be provided in conduit means 162 in order to permit flow of motive fluid from the carburetor 160 to the chamber 68 but prevent reverse flow back to the carburetor. An ambient air intake assembly 166 comprised of a housing 168, containing a suitable filter material 170, communicates with chamber 116 as by conduit means 172 which also preferably contains suitable check valve means 174 which permits flow into chamber 116 but prevents flow from chamber 116 to the housing 168 and ambient atmosphere.

SECOND EMBODIMENT OF THE INVENTION

Figure 9:
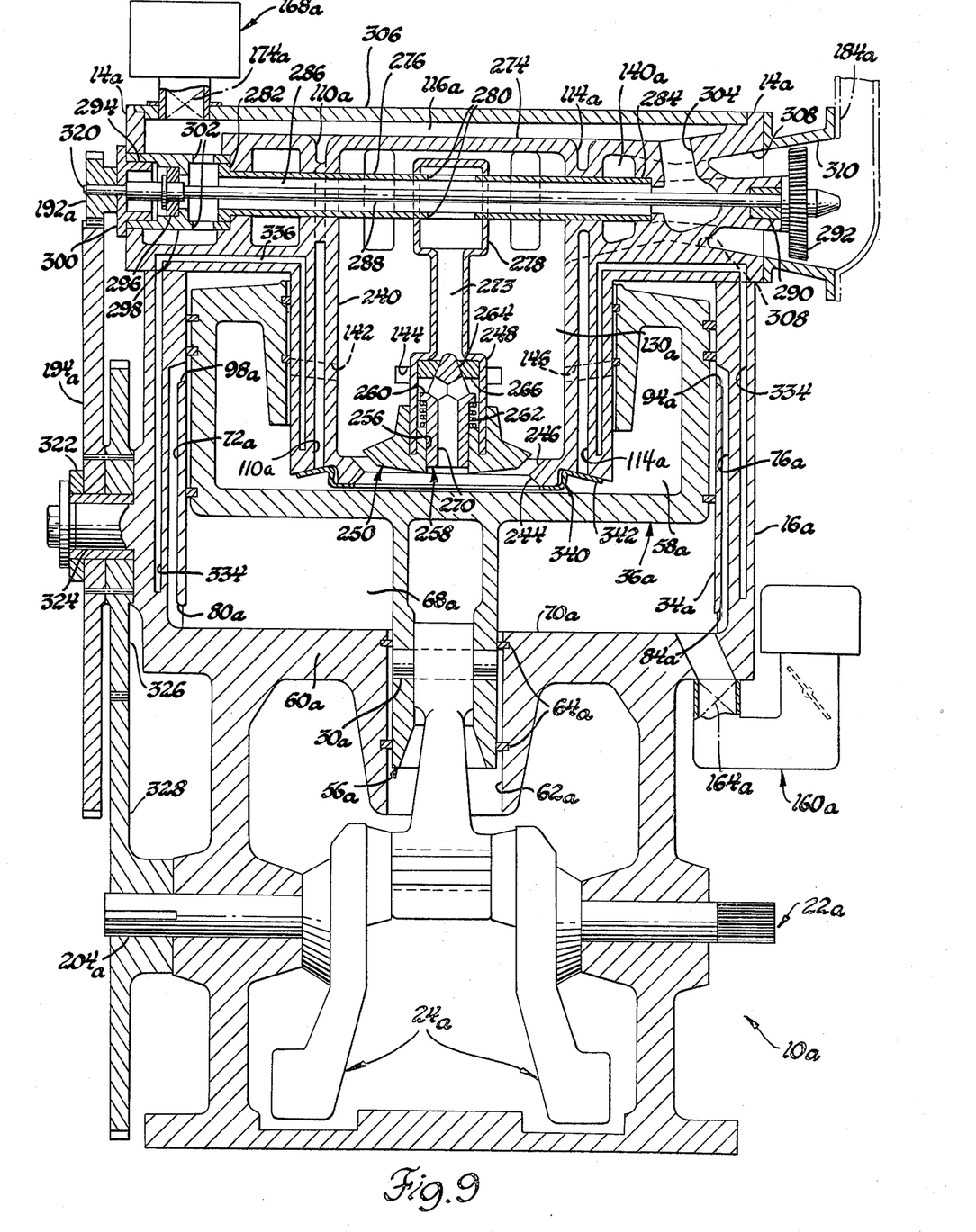
FIG. 9 is a view similar to FIG. 4 but illustrating in enlarged scale and in greater detail details and elements, along with their relationships, which may comprise an embodiment of an engine assembly constructed in accordance with the teachings of the invention.
Figure 10:
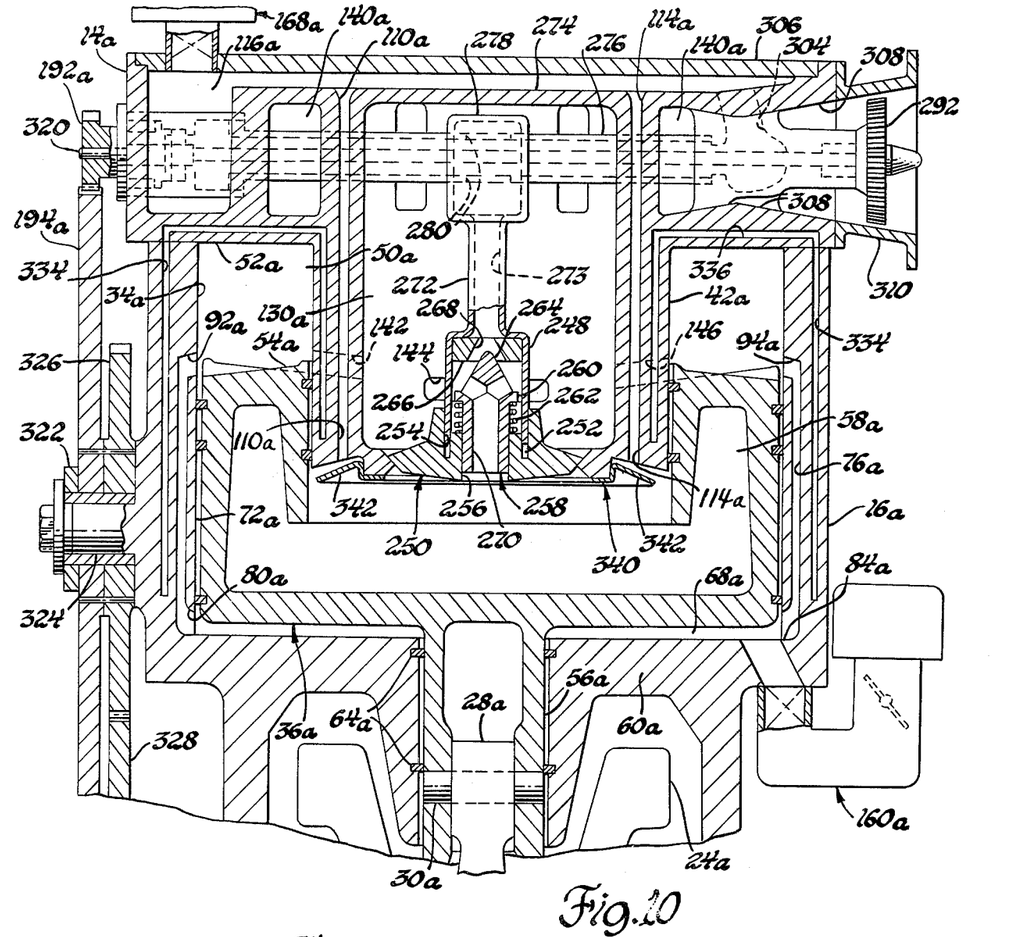
FIG. 10 is a fragmentary view, similar to that of FIG. 9 but illustrating the engine under a condition of operation different from that shown in FIG. 9 along with certain of the elements thereof being illustrated in such different condition of operation.

FIGS. 9 and 10 illustrate a second embodiment of the invention which, in many respects is either identical or similar to the engine as disclosed in FIGS. 1–8. All elements of FIGS. 9 and 10 which are like or similar to those of FIGS. 1–8 are identified with like reference numerals provided with a suffix "a". Certain of the details or elements previously shown in FIGS. 1–8 may be omitted for clarity.

Referring now in greater detail to FIGS. 9 and 10, the engine 10a is illustrated as comprising an upper engine housing section 14a which includes, preferably as an integral portion thereof, a downwardly depending portion 240 which, in turn, carries an annular end member 242 with an orifice 244 formed therethrough and an annular valve seating surface 246 formed thereabout.

A shroud-like member 248 situated generally within afterburner chamber 130a, slidably receives a valve head 250, which is centrally located, adapted to be at times sealably seated on the annular valve seating surface 246 provided in the downwardly depending portion 240 of housing section 14a. The valve head 250 is angularly slidably retained by the cylindrical shroud-like member 248 and cooperating annular groove or recess 254 while the upward motion of valve 250 is restricted as by bottoming-out in the groove 254, at which time the valve 250 has been permitted to open only the necessary amount. As shown in FIG. 10, the valve head 250 is shown seated against valve seat 246 and therefore a gap 252 between the end of the shroud-like member and the bottom of the groove 254 in the valve head is visible.

Valve head 250 has a centrally disposed cylindrical opening 256 in which a secondary valve member 258 is slidably retained. This secondary valve has a flange 260 to provide a shoulder for a spring entrapment between the step in the valve head 250 and said secondary valve 258 as to accommodate a coil spring 262 therein. The strength and height of this spring 262 is such that when valve head 250 is seated, as shown in FIG. 10, the secondary valve 258 may be unseated. As it later will become apparent there is a certain interplay of pressures involved to automatically and alternatively working these valves to open and close. Further, the secondary valve 258 has a preferably tapered cone portion 264. Above valve 258, and fixedly secured in the shroud 248, in a valve seating member 266 which is provided with a valve seating orifice surface 268 effectively matching the size and taper of the cone or valving surface 264. In FIG. 9 it can be seen that the secondary valve 258 is seated while the valve head 250 is unseated while in FIG. 10 the reverse can be seen; that is, when the valve head 250 is seated, the secondary valve 258 is unseated. Valve 258 which also defines a conduit or passage 270 therethrough, provides, when unseated, communication therethrough between the chamber 58a and the center or inner core or passage 273 of the shroud 248 above and beyond the valve seating member 266. A portion of the shroud 248 may be slightly necked down as at 272 above the point where the valve seating member 266 is located. Toward the capped top 274 of afterburner chamber 130a the shroud 248 may be wider again but at least large enough that therethrough a hollow insert 276, maybe of tubular shape, is fitted together with the shroud head 278, whereby these members are preferably sealed airtight at the joints. Within the inner section of the shroud head 278 the tubular insert 276 is provided with apertures 280 for the communication of air flow between the chamber 116a and the inner space 286 of the shroud 248. The insert 276, which is transversely situated in its entire length in the upper part of housing 14a, is at opposite ends 282 and 284 sealably fastened and secured to the respective joints provided within housing 14a. The inner space 286 acts as a heat shield for a turbine shaft 288 situated therewithin. Said turbine shaft 288 is at one end journalled with suitable bearings 290 as well as being provided with an appropriate power turbine wheel 292 situated in the downstream path of the exhaust gases leaving the plenum chamber 140a. The opposite end of the turbine shaft 288 is also journalled with suitable bearings 294 and 296 which are contained as in a spacer 298 which is capped by a retainer 300. The spacer 298 is provided with a plurality of apertures 302 to provide access of cooling air for the turbine shaft 288 with such air being drawn in from the chamber 116a via ports 302 and 304. Port or passageway 304, provided to balance the cooling along the turbine shaft is located close to the turbine wheel 292 so as to better assure that an equal amount of cooling air can be drawn from chamber 116a along the turbine shaft 288 toward the center where the shroud head 278 is situated. Preferably, the chamber 116a is provided with a removable cover 306 for better servicing. There is a transitional venturi-shaped guide opening 308 provided to ensure that the exhaust gases will strike the power turbine wheel 292 with the most effective angle. In the area where the power turbine wheel 292 operates there may conveniently be securely attached to the engine housing 14a a shroud member 310 to fit, with the required precision, the particular operational shape of the turbine arrangement. Attached to said shroud member 310 suitable exhaust conduit means 184a is provided and suitably fixedly secured as by any suitable securing means (not shown) to the shroud member 310. The purpose of conduit means 184a is to convey the engine exhaust gases to any desired point away from the engine.

The output end 320 of the power turbine shaft 288 has a small pinion gear 192a attached thereto and secured as by keying means to said turbine shaft. Pinion 192a is in meshed engagement with a larger spur gear 194a for effective reduction of the fast rotating turbine shaft 288. The spur gear is rotatably journalled on suitable bearing means 322 which are rotatably secured to a shaft 324 anchored in housing 16a. For further speed reduction, if desired or necessary, the spur gear 194a may be coupled, fixedly, with a secondary spur gear 326 having a distinctly smaller diameter than gear 194a. A distinctly larger spur gear 328 may be in meshed engagement with such secondary gear 326. The spur gear 328 may be fixedly keyed to the stub shaft 204a of cranking means 24a. It will be obvious that through the positive gear reduction with a gear train as shown in FIG. 9 the power output of the fast turning power turbine shaft 288 can be transmitted with simple inexpensive gearing to the crankshaft output means, thereby adding a considerable amount of work energy, otherwise lost, to the conventional energy output which is extracted from the engine via the crankshaft.

In addition to the plurality of conduits communicating as between chambers 68a and 50a as typically depicted by conduit means 72a and 76a, housing section 16a is provided with passage means 336 formed in the engine header section 14a, to define a coolant passageway or network, if such be desired. The plurality of passages, as typically depicted at 110a and 114a, serve to communicate between upper chamber 116a and piston pumping chamber 58a. However, such communication is effective for single directional flow from chamber 116a to pumping chamber 58a because of an annular reed-like check valve 340 suitably fixedly retained as at the end of circular wall 240 containing the valve orifice with valve seat 246, whereby radiating portions 342 normally tend to spring slightly away from the lower openings of such passages as typically depicted at 342 and as best shown in FIG. 10. Further, as ring piston 36a moves upwardly not only is valving member 250 opened as previously described with reference to FIGS. 1–8, but the increased pressure within the decreasing volume of piston pumping chamber 58a is applied against such reed-like valving or check valve extensions 342 to hold them sealingly closed against the juxtaposed lower orifices of the passages (as 110a and 114a) leading upwardly to chamber 116a. This way a relatively high compression ratio can be obtained which can be fully utilized to overcome the expected back pressures of both chambers 50a and 130a. Further, assuming the piston 36a is nearing the top dead center position, as shown in FIG. 9, it can be seen that the reed-like valving means 340 because of the increased pressure is closed whereas valve head 250 because of the same increased pressure is opened allowing the pressurized but still relatively cool and fresh ambient air to flow into the afterburner chamber 130a. Meanwhile this same pressure condition also holds the secondary communicating valve 258 tightly sealed. At the beginning of the down stroke of ring piston 36a the higher pressure in the afterburner chamber 130a will immediately close the valve head 250 and soon thereafter the pressure differential build up in the chamber 116a will cause the reed-like valve portions 342 to open and also simultaneously cause the opening of the secondary independent check valve 258 which, in turn, frees the air flow through the shroud-like structure 272. This air flow is in particular important because, as it can be seen in FIG. 10, when valve 258 opens air is drawn from chamber 116a through holes or passages 302 and 304 into the tubular insert 276 where it moves along the turbine shaft 288, passes through apertures 280 and follows the shroud 272, through passage means 270 of check valve 258, and into the ring piston chamber 58a. The intermittent air flow which takes place in accordance with every down stroke of the cup-like ring piston 36a performs a considerably important cooling task for the turbine shaft 288 and the shroud member 272 with its valving set-up.

Below the bottom of the cup-like ring piston is another chamber 68a having a wall partition 60a whose upper surface 70a restricts the size or depth of this chamber. The ring cylinder wall 34a confines this chamber in diameter. There are also a plurality of passages or conduit means 72a, 76a which have lower openings 80a, and 84a, communicating with chamber 68a, and upper openings 92a and 94a shown communicating with the combustion chamber 50a.

The transverse dividing wall 60a has an aperture 62a formed therein for slidable reception of a cylindrical extension 56a, which is a depending portion of the cup-shaped ring piston 36a being in diameter noticeably smaller than the overall outside diameter of the piston 36a.

A plurality of piston rings 64a may be provided and carried by the cylindrical extension or else the piston rings 64a may be retained fixedly in the opening of wall 60a as shown.

As previously generally indicated but as best shown in FIG. 10, in addition to passages 92a and 94a, a plurality of additional passages are provided leading from combustion chamber 50a through the thickness of the wall of generally cylindrical member 42a. Such additional or conduits of which 142, 144, 146 may be representative are preferably equidistantly spaced from each other and are intended for discharging the hot gases into the afterburner chamber 130a when such additional passages are uncovered by the piston 36a.

The operation of the engine, as disclosed in FIGS. 9 and 10 is as that described with reference to FIGS. 1 through 8 except of course for such features as have been specifically referred to as being somewhat a departure of FIGS. 1–8.

GENERAL COMMENTS RELATING TO AND BENEFITS OF THE INVENTION

From the preceding it can be seen that each embodiment employs a particular ring piston which also has the basic form of a cup. Further, such cup-like ring piston is so formed as to enable power to be transmitted from it through a single piston rod and single crank. The advantage, obviously, is one of simplicity for easy manufacture and low cost. This type of construction also permits the continued use of most of the manufacturing tools and machines. Performance-wise, a new technical advance can be utilized by the new improved practical adaptation of a ring piston which is derived from theoretical findings. The inherent advantages become apparent when fully understood and applied according to the teachings of the invention. In the following detailed comments, it will be explained how, due to particular characteristics of a ring cylinder, there can be two important and outstanding advantages usefully explited which are technically not feasible when a conventional cylindrical piston is employed. The first important advantage is, that with a ring piston significant reductions in heat loss through the cylinder wall can be achieved. Secondly, with a ring piston of the particular novel construction according to the invention, it becomes a possibility that within the inner core of the ring piston another core of suitable dimensions can be created which in essence will function as an advanced and significantly improved afterburner whose performance will at least greatly reduce the exhaust emissions and quite possibly meet the strict governmental emissions standards. Thirdly, with new and improved configuration of a cup-like piston according to the invention additional benefits are made possible, of which the main advantage is the ability to select the correct size of the cup within the ring piston and thereby make it possible to establish, deliver and inject the most useful quantities of fresh ambient air into the afterburner section. Even excess air can be provided which at times and under certain conditions is desirable. And with predetermined pressure such air may be transferred automatically and regularly with each upstroke of the cup-like ring piston. The advantage is that this pumping cycle will keep constant pace with the engine regardless of cranking speeds. This is an excellent contributing factor for better performance, mainly of the afterburner section.

The following are, in the main, highlights of how a ring piston can be useful in minimizing heat losses through the cylinder wall as compared to heat losses incurred by the conventional piston engine.

Generally, a significant factor in heat transfer, in average conventional piston engines is the amount of combustible gas volume contacting the cylinder walls during the process of combustion within the combustion chamber. The effective relationship between area of the combustion chamber and the volume of combustible gas enclosed within the cylinder walls in known as the "surface to volume ratio" (S/V) of the combustion chamber. As the surface area of the combustion chamber increases, the gases are exposed to a greater cooling area. However, the quantity of heat added for a given load and a given air-fuel ratio (A/R) depends on the amount of fuel introduced into the combustion chamber. The heat produced for a given amount of air-fuel mixture is utilized as work within the combustion chamber. It is also well known that the space or volume of the combustion chamber in which such heat is generated and confined is very important because part of such generated heat will be lost through the combustion chamber walls; the amount of such heat loss, in turn, depends on the S/V ratio. That is, the larger the S/V ratio the greater the heat loss will be through the cylinder walls. Therefore, the expected cooling of the gases within a particular combustion chamber is directly related to its surface-to-volume ratio, S/V.

However, the top or crown surface area of the piston is not included in the computations or calculations of the S/V ratio because such surface does not provide a direct path for heat conduction from the combustion chamber to the engine coolant or water jacket. Accordingly, with this in mind, the S/V ratio can be manipulated to the best advantage of reducing potential heat losses in the following manner.

As will become apparent, the S/V ratio between a smaller diameter piston and a larger diameter piston can be considerably different. As an example, let two different engines be considered wherein both the piston-diameter-to-stroke ratios and compression ratios of the engines are equal to each other but the first engine has a 3.0 inch bore and 3.0 inch stroke (with a compression gap of 0.67 inch at top dead center).

With regard to the first example, that being the 3.0 inch bore, it can be seen that the combustion chamber surface would be the area at the top of the cylinder plus the cylindrical wall area at top dead center piston position, or Surface $= (\pi \cdot D^2/4) = (2\pi \cdot r \times 0.67)$
Where:
$\pi = 3.14$
$D = 3.0$ inches
$r = 1.50$ inches
therefore:
Surface area $= 13.38$ square inches. However, the volume of that combustion chamber would be:
Volume $= (\pi \cdot D^2/4) \times 0.67 = 4.74$ cubic inches
The ratio of the above would be:
$S_1/V_1 = 13.38/4.74 = 2.82/1.00$ With regard to the second example, that being the 6.0 inch bore, it can be seen that the combustion chamber surface area ($S_2$) would be the area at the top of the cylinder plus the cylindrical wall area at top dead center piston position, or,
$S_2 = (\pi \cdot D^2/4) + (2\pi \cdot r \times 1.34)$
Where:
$\pi = 3.14$
$D = 6.0$ inches
$r = 3.0$ inches
therefore:
the surface area, $S_2, = 53.54$ square inches. However, the volume ($V_2$) of that combustion chamber would be:
$V_2 = (\pi \cdot D^2/4) + (2\pi \cdot r \times 1.34)$ Where:
$\pi = 3.14$
$D = 6.0$ inches
$r = 3.0$ inches
therefore:
the surface area, $S_2$, = 53.54 square inches. However the volume ($V_2$) of that combustion chamber would be:
$V_2 = (\pi \cdot D^2/4) \times 1.34 = 37.6$ cubic inches
The ratio of the above would be:
$S_2/V_2 = 53.54/37.6 = 1.43/1.00$ The above two examples illustrate a striking difference between the respective surface-to-volume ratios. That is, it can be seen that the smaller cylinder has an approximate 100% greater surface-to-volume ratio than the other cylinder which is 100% larger in diameter.

Even though the 6.0 inch cylinder has a comparatively favorable surface-to-volume ratio, it, nevertheless, can not as a practical matter be employed in automotive applications primarily because of the 6.0 inch stroke (or one close to it) which would have to be employed, as a practical matter, giving due consideration to feasible compression ratios.

In view of the above, the advantages of the ring-type piston and cylinder of the invention can now better be considered. Generally, the following will show that the ring piston and cylinder of the invention will provide a better surface-to-volume ratio while at the same time reducing the piston stroke from what would otherwise be required by the prior art.

In order to illustrate the above and better relate it to the first example of a 3.0 inch cylinder and piston, let the following be assumed:
1. $D_1 = 15.00$ inches = the outer diameter of the ring piston of the invention:
2. $D_2 = 12.00$ inches = the inner diameter of the ring piston of the invention:
3. $C.G. = 0.67$ inches = compression gap at top dead center of piston stroke;
4. $r_1 = \frac{1}{2} \times D = 7.50$ inches
5. $r_2 = \frac{1}{2} \times D = 6.00$ inches
6. stroke = 3.00 inches (same as in previous first example)

Therefore, the surface area ($S_3$) of the ring cylinder can be computed as follows:
$S_3 = (\pi \cdot D_1^2/4) (\pi \cdot D_2^2/4) + [(2\pi r_1 - 2\pi r_2) (0.67)]$
$S_3 = 69.92$ square inches
The volume of the combustion chamber can be calculated as follows:
$V_3 = (\pi \cdot D_1^2/4) (\pi \cdot D_2^2/4) (0.67) = 42.6$ cubic inches
Accordingly, in view of the above it can be seen that the surface-to-volume ratio of the ring cylinder of the invention is:
$S_3/V_3 = 69.92/42.6 = 1.63/1.00$ In comparing the value of $S_3/V_3$ to the value of $S_1/V_1$ it can be seen that the volume content was increased to 69.92 square inches while the surface area was reduced to 42.6 cubic inches and that there has been a 42% reduction in the surface to volume ratio.

According to the prior art, if one wanted to change the surface to volume (S/V) ratio substantially it was necessary to increase the piston diameter simultaneously with the piston stroke. As in the case of the second example considered (the 6.0 bore and 6.0 stroke engine) the S/V ratio was improved by about 100% by increasing the cylinder volume eight times and doubling the stroke.

Now, let it be assumed that a first engine having a 3.0 inch bore and 3.0 stroke has a total of four cylinders which, as a conventional engine, would have two explosions or ignitions occurring per revolution, and that such an engine were to be replaced by an engine of a single cylinder, of prior art design, having a volume equal to eight small cylinders of the first engine. Let these two engines be compared on an assumed operational speed of 6,000 R.P.M. of the smaller engine.

Accordingly, in order for the single large conventional piston engine to have an explosion volume equal to that produced by the four cylinder engine, it would have to run slower. That is, being of four-cycle, the one large cylinder would have one working or power stroke for each two revolutions. For example, the small four cylinder engine with two explosions per revolution would have, at 6,000 R.P.M., a working volume of: 12,000 × 4.75 cubic inch = 57,000 cubic inches whereas, the single large piston having a volume eight times larger would have to undergo or attain an R.P.M. of only 3,000 R.P.M., in order to produce an equivalent working volume of 57,000 cubic inches with all such volumetric computations being based on S/V ratios.

Obviously, even though certain advantages are obtained with such a theoretical single large piston engine, it does not result in a most desirable engine design especially when one considers that it would have one working stroke every second engine revolution.

However, with the ring type cylinder and piston of the invention, highly desirable characteristics are obtained. The following tabulated data (obtained from previous calculations) illustrates the comparison between the single 3.0 inch bore, 3.0 inch stroke cylinder of the first example to the single cylinder of the invention.

|  | Single 3.00 in. Cylinder | Single Ring Type Cylinder |
| --- | --- | --- |
| Volume | 4.75 cu. in. | 42.6 cu. in. |
| Volume Increase | — | 9 times |
| S/V ratio | 2.82/1.00 | 1.63/1.00 |
| Stroke | 3.00 inches | 3.00 inches |
| Compression | Same | Same |

Since the single ring type cylinder, of the third example previously given, has a total volume of 42.6 cubic inches, which is approximately nine times the volume of one single 3.00 inch cylinder of the small four cylinder engine, it should be obvious that the ring cylinder engine, in producing the same explosive volume, would run proportionately slower. In addition, as shown by the preferred embodiments of the invention herein disclosed and described, it is preferable that the ring piston be employed as a two-cycle engine instead of a four-cycle engine.

Accordingly, in order for the single ring piston to produce a comparable power output, 57,000 cubic inches of combustible mixture has to be exploded in the ring cylinder every minute. However, if the ring piston is in a two-cycle engine, each down stroke of the ring piston will be power stroke. Therefore, in order to determine the engine R.P.M. of the ring piston engine the total of 57,000 cubic inches per minute has to be divided by 42.6 cubic inches per stroke (which is also per R.P.M.) which resuilts in 1,350.0 R.P.M. required for the single ring piston engine to produce the equivalent power.

In view of the above, it can be seen that the ring piston engine of the invention will produce the same power as the smaller diameter (3.0 inch) bore, four cylinder engine but at a much slower engine speed. That is, the same power as was produced by the four cylinder engine at 6,000 R.P.M. is produced by the ring piston engine at 1,350.0 R.P.M.

As a consequence of the above, additional benefits relating to piston speed, are derived. In the conventional four cylinder engine referred to, at an engine speed of 6,000 R.P.M., each piston has to travel twice the stroke for each engine revolution. Therefore, in such a prior art engine as assumed herein, the average piston speed would have to be 3,000.0 feet/minute while the average piston speed for the comparable ring piston of the invention, also traveling for each engine revolution twice the stroke, would only be 675.0 feet/minute. In other words, the comparable ring piston engine reduces piston speed by approximately 75%, reduces the surface to volume ratio (S/V) by over approximately 42% and yet produces the same power output.

Figure 7:
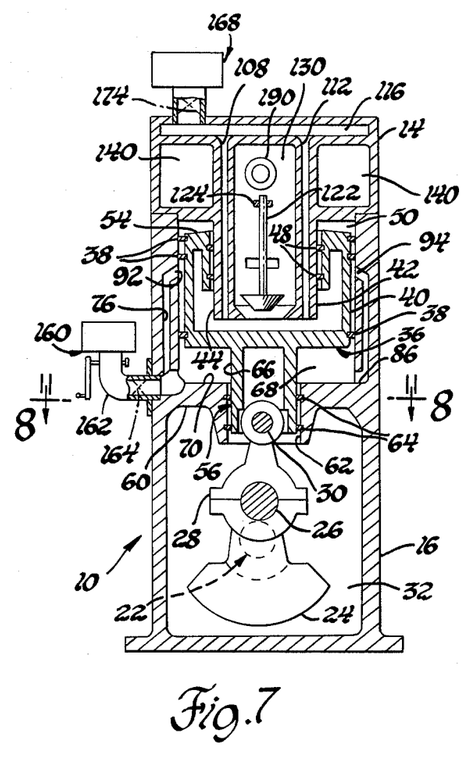
FIG. 7 is cross-sectional view taken generally on the plane of line 7—7 of FIG. 2 and looking in the direction of the arrows.
Figure 8:
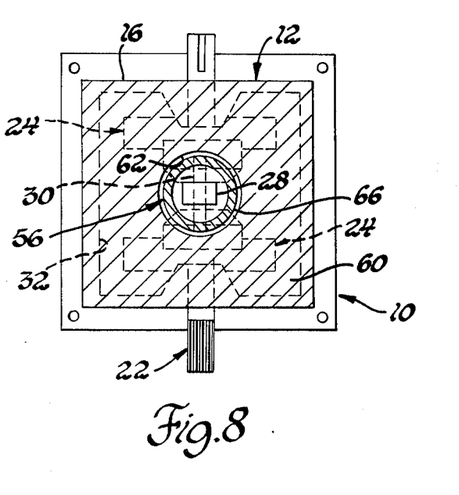
FIG. 8 is a transverse cross-sectional view taken generally on the plane of line 8—8 of FIG. 7 and looking in the direction of the arrows.

Accordingly, in view of the above, it can be seen that the invention as herein disclosed provides a ring piston engine, which has a significantly improved surface to volume ratio and reduced piston speed which, especially when combined with an afterburner section or chamber, such as for example chamber 130 of FIG. 7, chamber 130a of FIGS. 9 and 10 for the continued burning of the exhaust gases, has performance characteristics unlike that of the prior art engines and is also effective for either totally or at least greatly inherently minimizing the production of air-polluting exhaust emissions.

Further, through the novel incorporation of an afterburner which is situated mainly in the inner core of the inner wall of a ring cylinder housing, which in turn is fitted with a cup-like ring piston, significantly improved efficiency of the afterburner can be achieved because the cup-like addition to the ring piston is a significant contributing factor for an increased efficiency of said afterburner.

The basic thermal reactor features when used with a conventional engine are essentially a unit added to the outside of such an engine. Such are add-on devices with a heavy cast iron body having an insulated reactor chamber in which unburned HC and CO emitted from the combustion chamber are oxidized into $CO_2$ and $H_2O$ in the presence of air at high temperatures. Oxidation is achieved by addition of secondary air to the exhaust gases entering the reactor. A heavy walled cast iron outer housing is necessary to provide adequate strength to support the pressures and also support the sheet metal liner and the attached exhaust system. The sheet metal liner, of various shapes, essentially serves the purpose of preventing the hot exhaust gases from scrubbing and quenching against the cooler cast iron surfaces in certain regions. This is particularly important during engine warm-up. For better efficiency high temperature applications, blanket type insulation is used in the better quality reactors. Such insulation is located between the outer housing and the sheet metal internal liners to retain the reactor heat. Such composite materials, as described above, do improve the overall efficiency of the reactor system. The period during which a rapid oxidation of HC and CO occurs due to elevated exhaust temperatures is called residence time.

It is obvious that any such specific add-on thermal reactor, no matter how efficient it is, will have a given weight of its own, will consume or require a specific volume of space beside the engine, and very probably require the use of a heat shield as between itself and the vehicle. Further, such a thermal reactor has its own price and installation costs which must be paid. Obviously, if any one or more of the above penalties could be eliminated, it would be considered technological and economical progress.

It should be quite apparent that with the invention as herein disclosed that indeed a substantial improvement in all of the above-mentioned prior art deficiencies is achieved.

The invention makes it clear that the thermal reactor, as in the form of an afterburner, can be incorporated into the center core of the engine itself thereby making it unnecessary to provide separate add-on thermal reactor units. This, in turn, means that the housing, required space and at least a substantial portion of the weight of the add-on thermal reactor has been eliminated. It should also be pointed out that while the external add-on type thermal reactor needs its own housing of heavy cast iron it still must be connected to a special heavy manifold structure. This is not required by the invention.

In contrast, the engine of the invention does not require a manifold at all and does not require an extra independent housing for its thermal reactor section because the inner ring cylinder walls do provide, simultaneously, the housing for the centrally located afterburner or thermal reactor thereby making the conventional exhaust manifold obsolete because the transition of the exhaust gases from the combustion chamber is in a most direct path as through porting through the inner cylinder wall of the ring cylinder. Therefore, the flow of the gases from one compartment to another is at least 90% shorter and heat losses via manifold and reactor surfaces is totally eliminated.

Further, there are quite a number of performance benefits to be gained from the utilization of a cup-like ring cylinder and a centrally located afterburner operating in unison and specifically in the mode of a two-cycle engine.

It is well known that ordinarily a two-cycle engine is generally considered inferior to a four-cycle engine by comparison. The decisive factor for this general belief, thus far, was that the two-cycle engine had the obvious disadvantage of consuming more fuel (about 23% average) than a four-cycle engine of the same rated horsepower.

However, since the inception of stringent exhaust emission standards the advantage of the four-cycle engine over the two-cycle engine in regard to better fuel economy does not exist anymore. In fact, it has been proven that the four-cycle engines must operate on richer fuel mixtures so that the after treatment of the exhaust gases can be efficient. However, all of this is done with the result being that the combustion chamber delivers less working energy because of reduced compression ratio which is made necessary in order to reduce oxides of nitrogen ($NO_x$) emissions. Therefore, the use of richer fuel-air mixtures does not in any way improve the power output of the engine.

Accordingly, if an engine of the four-cycle type were to maintain the same output horsepower as it could have if operating before the imposition of emission standards, it would consume about 23% to 25% more fuel.

In view of the penalties, it becomes obvious that the fuel economy of a four-cycle engine, of the present state of the art, versus a two-cycle engine is now substantially the same and the contention that a four-cycle engine has better fuel economy, as compared to a two-cycle engine of the same rated output, is not true anymore. To better understand how the prior art emission controls effect the engine technology, the following table is presented wherein the emissions of a four-cycle and two-cycle engine (of same rating) are compared with such comparison being made on engine operation without any added emission control devices.

| AVERAGE EMISSIONS WHEN OPERATED AT FULL LOAD WITH OPTIMUM FUEL/AIR RATIO | |
|---|---|
| Four-Cycle Engine | Two-Cycle Engine |
| 8.0g. of HC/H.P.—h | 140.0g. of HC/H.P.—h |
| 180.0g. of CO/H.P.—h | 250.0g. of CO/H.P.—h |
| 5.0g. of $NO_x$/H.P.—h | 1.7g. of $NO_x$/H.P.—h |

From the above, it should be apparent that the $NO_x$ emission level, which is the most difficult emission to reduce or eliminate in a four-cycle engine, is already 66% lower in the two-cycle engine.

When a thermal reactor is combined with an engine, the reactor needs about 20% to 25% unburned HC residue in the engine exhause for efficient operation. For this reason, when a thermal reactor is operated in connection with a four-cycle engine it becomes necessary to re-calibrate the fuel mixture to be richer by about 15% to 20% so that the exhaust gases while flowing from the combustion chamber to the reactor are still carrying the required amount of unburned HC into the reactor for further oxidation. As far as power output is concerned, the additional fuel thereby provided to the engine is a total waste.

Therefore, when both the four-cycle engine and two-cycle engine have to operate in conjunction with an afterburner or thermal reactor, the prior existing poorer fuel economy of the two-cycle engine is nullified because the two-cycle engine, in conjunction with a thermal reactor, has enough unburned HC in the exhaust gases to sustain the oxidation process within the reactor. Therefore, the two-cycle engine would not need an increased richness in its fuel-air ratio. In fact, and in accordance with the invention, the fuel economy of the two-cycle engine is substantially improved because of the reduction in heat losses gained through the improved S/V ratio from the ring piston. Further, the described reduction of the piston speed also reduces the frictional losses as well as reduces the inherent noise level of the engine.

Further, the efficiency of the thermal reactor of the invention is a substantial improvement over the prior art in that excess quantities of fresh air can be effectively injected into the thermal reactor as by the pumping action of the cup-shaped ring piston.

In the invention, the further reduction of $NO_x$ emissions may be achieved as by a catalyst cartridge-like insert, in the exhaust system of the engine, which is easily replaceable if it cannot last for the life of the engine. Such a catalyst cartridge may be comprised of a ceramic type, platinum lined, or pellet-type device and it might be best to provide an individual cartridge for each cylinder of a multi-piston engine.

It should also be evident that the invention does not waste fuel which is otherwise wasted by prior art engines in the form of blow-down losses. In the invention, even if blow-down occurs, such fuel is subsequently pumped into either or both the afterburner chamber and the combustion chamber as previously described.

From the general description so far it can be assumed that the technological progress due to the characteristics of the cup-like ring piston of this invention is manifold, and it specifically makes it feasible to employ within this total engine concept an (auxiliary) exhaust gas turbine system as shown and described in several examples in sufficient detail. This incorporated turbine system will reclaim a substantial quantity of energy which is normally wasted with the escaping exhaust gases. The regained net energy from this turbine system is, by virtue of the shown power train, added to the torque output of the main crankshaft, or as also shown and described, the individual net output force of the turbine can be utilized to drive, independently, engine and/or vehicle accessories like alternators, water pumps, fuel pumps, cooling fans, etc.

Turbines effectively driven by the exhaust gases are known, but their effectivenss was limited so that they were used only to power drive compressors, known in the art as turbo superchargers. However, the overall concept of the engine of the invention substantially increases the expansion factor including the volumetric expansion quantities through additional special air pumping means to provide air injection into the afterburner. The total emitted gas quantities henceforth involved will be, it is believed, more than tripled, and because of that it becomes obvious that in conjunction with this invention one cannot any more compare the efficiency of such a turbine system with an ordinary supercharger turbine compressor, because to arrive at this particular achievement it is pointed out that the preparation of the inner compression chamber, as at 58a of FIGS. 9 and 10, within the cup-like ring piston is purposely provided to be able to introduce and inject a substantial amount of excess air into the afterburner chamber. This has the effect (beside reducing most of the polluting emissions in the exhaust gas, as explained before), of causing the quantities of fresh air pumped, in regular pulses, to get involved in the continued oxidation process and expand in proportion with the rapid heat rise thereof. This then creates a much larger volume of moving and expanding exhaust gases than would normally be available (within a conventional exhaust system). All of this represents naturally greater forces and the turbine power output will be increased accordingly.

It is obvious that when a most useful and effective work energy return of the exhaust gases via the turbine system is planned then the more or less constant gas pressures within the afterburner will be several p.s.i. above ambient pressure. For this reason the invention includes a third special compression chamber, as 68a of FIGS. 9 and 10, which is actually on the underside of the bottom of the cup-like ring piston 36a. This compression chamber draws in the air-fuel mixture (if the engine operates as an internal combustion spark ignition engine) or it draws air only (if it operates as an internal combustion diesel system). In either case the peak pressure of the gas volume within this chamber can be predetermined and should be sufficient to overcome the back pressure existing in the afterburner chamber at that moment when the entry ports 90a, 92a, 94a and 96a of the combustion chamber and the exhaust ports 142, 144, 146 and 148 of the combustion chamber are being opened.

This condition will better assure that new fuel-air mixtures will scavenge the combustion chamber and push the burned exhaust gases into the afterburner chamber. It is a fact that any gas engine knowingly suffers an energy heat loss through the exhaust gases between 30% and 36%. It is the purpose of the turbine system of this invention to re-claim a substantial portion of this wasted energy via the exhaust gases, the gained work energy via the turbine, the expected energy conservation via the improved S/V ratio, the savings in frictional horsepower losses via drastically reduced piston speed, which shall when combined, produce a substantially better fuel economy than was hitherto feasible through the commonly practiced engine technology.

Figure 11:
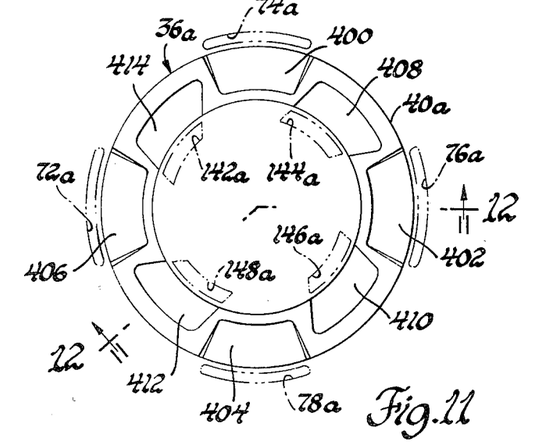
FIG. 11 is a top plan view, in reduced scale, of the annular or ring piston shown in FIGS. 9 and 10.
Figure 12:
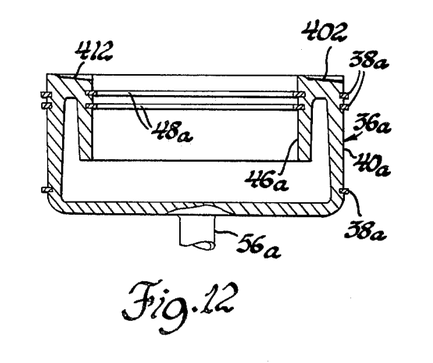
FIG. 12 is a side elevational view of the said annular piston, with portions thereof broken away and in cross-section with such view taken generally on the plane of line 12—12 of FIG. 11 and looking in the direction of the arrows.

FIGS. 11 and 12 illustrate in greater detail the preferred configuration of piston 36a. As shown, the top or head of piston 36a is formed to have a first plurality of inclined surfaces 400, 402, 404 and 406 angularly spaced from each other and inclined so that the radially innermost edge thereof is at a higher elevation. A second plurality of inclined surfaces 408, 410, 412 and 414 also angularly spaced from each other are generally interspersed between successive ones of said first plurality of surfaces. The second plurality of surfaces are so inclined as to have their radially innermost edges at a lower elevation. By providing such inclined surfaces the flow of relatively cold air into the combustion chamber from conduits 72a, 74a, 76a and 78a undergoes additional turbulence thereby aiding in the scavenging of exhaust gases from the combustion chamber.

Figure 13:
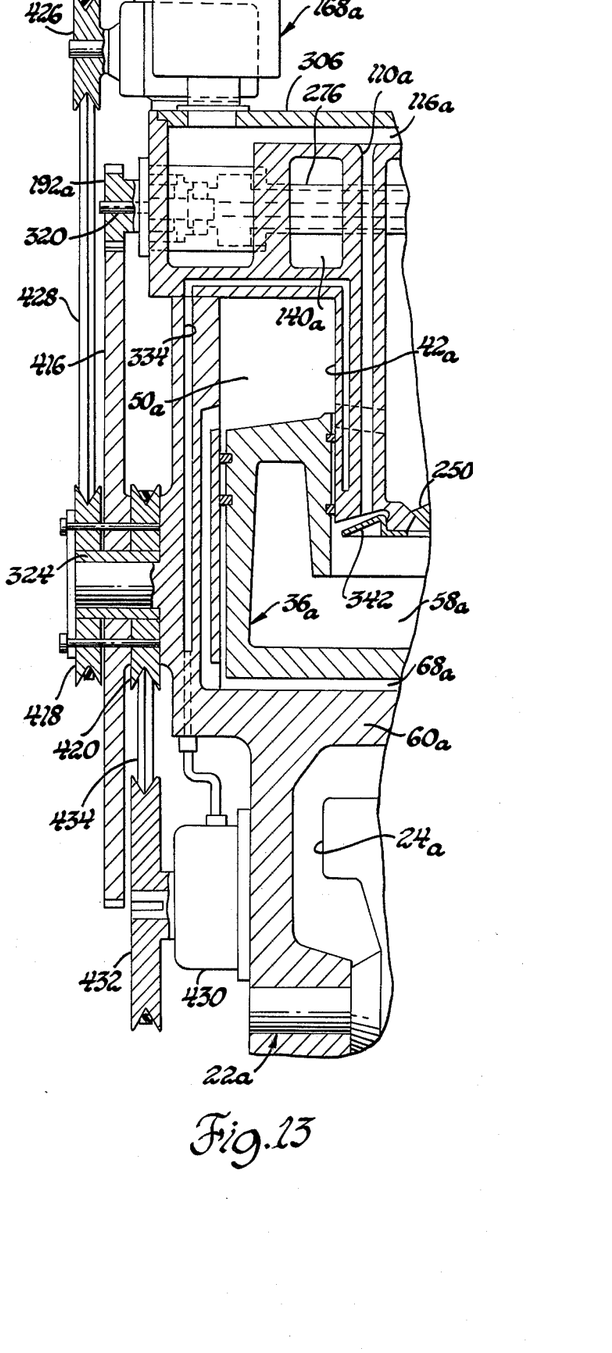
FIG. 13 is a further modification of the invention showing a cross-sectional fragmentary portion of the engine of FIG. 10 and a modified drive train in combination therewith driving related accessories.

FIG. 13 illustrates a modification of the invention wherein the output of the turbine assembly is directed to the driving of engine and/or vehicular accessories. By way of example, FIG. 13 illustrates gear 192a, suitably keyed to turbine output shaft 320, being in meshed engagement with a larger spur gear 416 which, in turn, is pinned or keyed to pulley sheaves or wheels 418 and 420 as to rotate in unison therewith about the pivot shaft or journal support 324. Means, such as electrical generating means 424 carried as by the engine 10, is provided with a keyed sheave 426 which, in turn, is driven as through drive belt means 428 looped about sheaves 418 and 426. Other accessories, such as a coolant pump assembly 430 is provided with a keyed sheave 432 which, in turn, is driven as by belt means 434 looped thereabout and sheave 420.

Accordingly, as can be appreciated from FIG. 13, the power output of the turbine means may be employed to supply added power to the engine crankshaft 22a or to engine and/or vehicular accessories and, further, may actually be arranged in view of FIGS. 9 and 13 to even simultaneously supply power through, basically, two different power trains one of which is to the engine crankshaft means and the other to the engine and/or vehicular accessories.

As should be apparent, the entire turbine section and assembly, as enclosed in housing section 14, can be easily removed from the remainder of the engine assembly without any major disturbance to the remainder of such engine. This enables, for example, the easy replacement of the entire turbine assembly for or during servicing of the engine as well as possibly replacing one particular turbine assembly of, for example, a particular rated output, with one of another rated output. Further, the general arrangement also permits the replacement of the turbine assembly and engine housing section 14, or 14a as the case may be, with a structurally equivalent housing section providing for all the necessary gas, air and exhaust flows with the exception that the actual turbine wheel assembly would be dispensed with and the afterburner section would exhaust directly to ambient atmosphere without driving a turbine wheel.

Although only selected preferred embodiments and modifications of the invention have been disclosed and described, it is apparent that other embodiments and modifications of the invention are possible within the scope of the appended claims.

I claim:

1. An internal combustion engine, comprising engine housing means, an annular cylinder formed in said housing means, said annular cylinder comprising a first radially inner annular wall and a second radially outer annular wall, combustion chamber means communicating with said annular cylinder, ring piston means received in said annular cylinder for reciprocating movement therein, motion transmitting means operatively connected to said ring piston means for transmitting the reciprocating movement of said ring piston means to associated power output means, afterburner means situated generally radially inwardly of said first inner annular wall and in communication with the ambient atmosphere, exhaust passage means communicating between said combustion chamber means and said radially inwardly situated afterburner means, said afterburner means being effective to receive said exhaust gases from said exhaust passage means and to enable further continued combustion of said exhaust gases within said afterburner means before discharging said exhaust gases to said ambient atmosphere, and power turbine means situated generally in the path of flow of said exhaust gases so as to extract therefrom additional power as said exhaust gases flow from said afterburner means to said ambient atmosphere, said power turbine means being carried by a separable engine housing portion of said engine housing means permitting said power turbine means to be readily disassembled from said engine.

2. An internal combustion engine according to claim 1 wherein said ring piston means and said power turbine means are both operatively connected to said motion transmitting means.

3. An internal combustion engine according to claim 1, wherein said exhaust passage means is formed through said first inner annular wall.

4. An internal combustion engine according to claim 1 wherein said ring piston means comprises cup-like ring piston means.

5. An internal combustion engine according to claim 4, wherein said cup-like ring piston means comprises first and second annular piston walls, wherein said first annular piston wall is juxtaposed to said first radially inner annular wall, wherein said second annular piston wall is juxtaposed to said second radially outer wall, said cup-like ring piston means further comprising an end wall situated generally transverse to said first and second annular piston walls and connected to one of said first and second annular walls as to effectively close said one of said first and second annular piston walls.

6. An internal combustion engine according to claim 4, wherein said cup-like ring piston means comprises first and second annular piston walls, wherein said first annular piston wall is juxtaposed to said first radially inner annular wall, wherein said second annular piston wall is juxtaposed to said second radially outer annular wall, said cup-like ring piston means further comprising an end wall situated generally transverse to said first and second annular piston walls and joined to said second annular piston wall.

7. An internal combustion engine according to claim 1, wherein said motion transmitting means comprises at least one rotary crankshaft situated at one axial side of said ring piston means and operatively connected thereto.

8. An internal combustion engine according to claim 1, wherein said afterburner means comprises an afterburner chamber with conduit means situated therein and communicating therewith, wherein said exhaust passage means is in communication with said afterburner chamber, and further comprising ambient air pumping means communicating with said conduit means situated within said afterburner chamber for supplying therethrough additional quantities of ambient air to said afterburner chamber in order to mix said ambient air with said exhaust gases in said afterburner chamber, and wherein said afterburner chamber is effective to employ the oxygen within said additional quantity of ambient air to further combust said exhaust gases before discharging said exhaust gases to said ambient atmosphere.

9. An internal combustion engine according to claim 4, wherein said motion transmitting means comprises at least one rotary crankshaft situated at one axial side of said cup-like ring piston means, and at least one connecting rod operatively connected to said rotary crankshaft and to said end wall of said cup-like ring piston means.

10. An internal combustion engine according to claim 1, wherein said exhaust passage means comprises a plurality of exhaust ports formed in said housing means generally radially inwardly of said annular cylinder and in communication therewith, and further comprising a plurality of inlet passages formed in said housing means generally radially outwardly of said annular cylinder, said inlet passages being adapted for supplying combustion air to said annular cylinder, said ring piston means comprising a head surface area comprised of a plurality of angularly spaced first and second contoured surfaces alternately interspaced, said first contoured surfaces being so positioned as to be at times placed in general radial juxtaposition to said inlet passages, said second contoured surfaces being so positioned as to be at times placed in general radial juxtaposition to said exhaust ports, said first and second contoured surfaces having portions inclined generally oppositely to each other for enabling said combustion air entering said annular cylinder from said inlet passages to form swirl paths within said annular cylinder in order to thereby better scavenge the exhaust gases from said annular cylinder and into said exhaust ports.

11. An internal combustion engine according to claim 1, and further comprising ambient air pumping means effective for supplying additional quantities of ambient air to said afterburner means in order to mix said ambient air with said exhaust gases in said afterburner means, and wherein said afterburner means is effective to employ the oxygen within said additional quantity of ambient air to further combust said exhaust gases before discharging said exhaust gases to said ambient atmosphere.

12. An internal combustion engine according to claim 4, and further comprising a pumping chamber, said pumping chamber being formed generally on the axial side of said cup-like ring piston means opposite to said combustion chamber means being adapted for communication with ambient air, second passage means communicating generally between said pumping chamber and said combustion chamber means, said cup-like ring piston means being effective when moving in a first direction toward said combustion chamber means to increase the effective volume of said pumping chamber to thereby cause said ambient air to flow into and fill said pumping chamber, said cup-like ring piston means being effective when moving in a second direction opposite to said first direction for decreasing the effective volume of said pumping chamber to thereby force said ambient air from said pumping chamber through said second passage means and into said combustion chamber.

13. An internal combustion engine according to claim 4, wherein said afterburner means comprises afterburner housing means, wherein said first radially inner annular wall of said annular cylinder comprises a portion of said afterburner housing means, wherein a portion of said afterburner housing means is continuously received with said cup-like ring piston means to thereby define a pumping chamber of distinct but variable volume generally within said cup-like ring piston means, said afterburner means comprising afterburner chamber means formed generally within said afterburner housing means and adapted for communication with said ambient atmosphere to thereby exhaust to said ambient atmosphere, valving means effective for at times terminating communication as between said afterburner chamber means and said pumping chamber, and air supply passage means for communicating between a source of ambient atmosphere and said pumping chamber.

14. An internal combustion engine according to claim 13 wherein said valving means comprises valve stem means, valve head means, and resilient means cooperating with said valve head means effective for resiliently urging said valve head means in a first direction to at times affect said termination of communication as between said afterburner chamber means and said pumping chamber.

15. An internal combustion engine according to claim 14 wherein said valve stem means is stationary and said valve head means is movable relative to and along said valve stem means.

16. An internal combustion engine according to claim 14 wherein said valve stem means comprises generally hollow passage-like means, wherein said power turbine means comprises a power turbine wheel, turbine wheel shaft means operatively connected to said turbine wheel, second power output means operatively carried by said shaft means, and further comprising bearing means journalling said shaft means to said engine housing portion, turbine shaft conduit means generally circumscribing at least a major portion of said turbine wheel shaft means within said engine housing portion, and wherein said hollow passage-like means is in communication with said turbine shaft conduit means in order to at least at times provide for the flow of cooling air therethrough.

17. An internal combustion engine according to claim 16 wherein said cooling air is drawn into said engine housing means and through said turbine shaft conduit means and said hollow passage-like means when said cup-like ring piston means is moving in said annular cylinder in a direction generally away from said combustion chamber means.

18. An internal combustion engine according to claim 16 wherein said valve head means comprises a first valving member, resilient means effective for resiliently urging said valving member in a direction to at times affect said termination of communication as between said afterburner chamber means and said pumping chamber, and wherein said valve head means further comprises a second valving member, said second valving member being effective to at times complete communication as between said hollow passage-like means and said pumping chamber and being effective at other times to terminate said communication as between said hollow passage-like means and said pumping chamber.

19. An internal combustion engine according to claim 18 wherein said first valving member is movable relative to and along said hollow passage-like means, and wherein said second valving member is movable relative to said hollow passage-like means and said first valving member.

20. An internal combustion engine according to claim 1 wherein said afterburner means comprises afterburner housing means, wherein said afterburner housing means is carried by said engine housing portion, wherein said first radially inner annular wall is carried by said afterburner housing means, and wherein said afterburner housing means comprises afterburner chamber means, and wherein said engine housing portion and said afterburner housing means are collectively removable from said engine housing means without disassembly of said ring piston means from said second radially outer annular wall.

21. An internal combustion engine according to claim 1 wherein said afterburner means comprises afterburner chamber means, and further comprising air plenum chamber means carried generally by said engine housing portion, first passage means for permitting communication between said plenum chamber means and said ambient atmosphere, and second passage means effective for at least at times completing communication between said plenum chamber and said afterburner chamber means.

22. An internal combustion engine according to claim 20 wherein said afterburner housing means is formed integrally with said engine housing portion.

23. An internal combustion engine according to claim 20 wherein said afterburner housing means comprises afterburner chamber means, and further comprising air plenum chamber means carried generally by said engine housing portion, first passage means for permitting communication between said plenum chamber means and said ambient atmosphere, and second passage means effective for at least at times completing communication between said plenum chamber and said afterburner chamber means, and wherein said second passage means is formed through said afterburner housing means.

24. An internal combustion engine according to claim 1 wherein said ring piston means is operatively connected to said motion transmitting means, and wherein said power turbine means is operatively connected to second motion transmitting means for supplying turbine power to associated engine-driven accessories.

* * * * *